(12) United States Patent
Okamura

(10) Patent No.: US 7,420,190 B2
(45) Date of Patent: Sep. 2, 2008

(54) LENGTH MEASUREMENT PATTERN, SEMICONDUCTOR DEVICE, AND METHOD OF MANUFACTURING A SEMICONDUCTOR DEVICE

(75) Inventor: Ryuichi Okamura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 394 days.

(21) Appl. No.: 11/356,121

(22) Filed: Feb. 17, 2006

(65) Prior Publication Data

US 2006/0219913 A1    Oct. 5, 2006

(30) Foreign Application Priority Data

Mar. 9, 2005    (JP) ............... 2005-066338

(51) Int. Cl.
*G01N 23/00*    (2006.01)
*G03F 9/00*    (2006.01)

(52) U.S. Cl. ............... 250/492.22; 250/310; 250/311; 250/492.2; 716/21; 430/5

(58) Field of Classification Search ........ 250/310, 250/311, 492.22, 492.2; 716/215; 430/5
See application file for complete search history.

(56) References Cited

U.S. PATENT DOCUMENTS 7,275,227 B1 * 9/2007 Ying ......................... 716/5
2008/0003510 A1 * 1/2008 Harazaki .................... 430/5

FOREIGN PATENT DOCUMENTS

JP    2003-197503    7/2003

* cited by examiner

*Primary Examiner*—Nikita Wells
(74) *Attorney, Agent, or Firm*—Young & Thompson

(57) ABSTRACT

A length measurement pattern is used for forming a contact and a via on a diffusion layer and on a lower layer interconnect, respectively, with a photoresist. The length measurement pattern includes a first pattern 16 serving as an object of length measurement in length measurement SEM and a second pattern 17 disposed to be spaced apart from the first pattern 16 and used for positioning and focusing of the length measurement SEM.

19 Claims, 4 Drawing Sheets

LENGTH MEASUREMENT PATTERN, SEMICONDUCTOR DEVICE, AND METHOD OF MANUFACTURING A SEMICONDUCTOR DEVICE

This application is based on Japanese Patent application NO. 2005-066338, the content of which is incorporated hereinto by reference.

BACKGROUND

1. Technical Field

The present invention relates to a length measurement pattern for dimension measurement in forming a photoresist of a contact or a via on a diffusion layer or on an interconnect, as well as to a semiconductor device using this length measurement pattern and a method of manufacturing a semiconductor device.

2. Related Art

FIG. 3 is a view of a semiconductor device having a general multiple layer interconnect structure in which a contact 11 is disposed on a diffusion layer 10 which is the lowermost layer; an insulating film 12 is stacked thereon; a lower layer interconnect 13 and a via 14 are formed thereon; and an upper layer interconnect 15 is formed on an upper part of the via 14. In the most developed one of such semiconductor devices, the patterning dimension of the contact 11 and the via 14 is made superfine, so that it is necessary to measure the dimension of the patterned photoresist correctly so as to grasp the dimension and to perform centering with a good precision. When a management of this dimension is neglected, a dimensional abnormality or the like may possibly be generated that directly leads to decrease in the yield or to inconvenience of properties.

As a technique for correctly measuring the dimension of a photoresist patterned in this manner, a method using the length measurement SEM is known in the art (See Japanese Laid-Open patent publication NO. 2003-197503). In order to measure the photoresist dimension by the length measurement SEM, it is necessary to dispose a pattern for the length measurement SEM in a photoresist. In a photoresist dimension measurement pattern in the step of forming a via shown in FIG. 3, a contact pattern is disposed on a diffusion layer 10 which is the lowermost layer, and a via pattern is disposed on a lower layer interconnect 13, so as to perform measurement of the photoresist dimension by using the length measurement SEM. At this time, it is known that, with a pattern that has been made superfine to the same degree as the wavelength of the light used for exposure, a difference occurs in the photoresist dimension between an isolated pattern and a dense pattern by a physical phenomenon at the time of exposure.

FIG. 4 shows a conventional dimension measurement pattern of an isolated pattern.

Referring to FIG. 4, the dimension measurement pattern 16 which is an isolated pattern disposed in the lower layer interconnect 13 is disposed in an isolated state of only one, so that, naturally, no pattern is disposed in the neighborhood thereof. Therefore, at the time of dimension measurement of the photoresist with this dimension measurement pattern 16, the positioning and focusing in the length measurement SEM and the actual dimension measurement are carried out with the same dimension measurement pattern. Here, although not illustrated in the drawings, the photoresist dimension measurement of a contact 11 is carried out in the same manner with the dimension measurement pattern disposed in the diffusion layer 10.

The conventional photoresist has a resistance to electron beams. Therefore, even if the positioning and focusing of the length measurement SEM and the actual dimension measurement are carried out with the same dimension measurement pattern 16, no fatal fluctuation in the dimension or the like occurs, and no problem has been raised.

However, the photoresist used in an exposure apparatus using an ArF laser light source that is used in the currently most developed process and in the subsequent most developed lithography technique is weak in the resistance to electron beams. Therefore, it is known that, when electron beams are applied for a long period of time at the time of dimension measurement with the length measurement SEM apparatus used in the photoresist dimension measurement, the resist will be etched, making it impossible to carry out a correct dimension measurement.

With a currently used photoresist for an exposure apparatus using an ArF laser light source, a dimension fluctuation of about 1 nm/1 sec is seen in the photoresist dimension value when electron beams having an acceleration voltage of about 800 to 1600 V is radiated, though depending on the condition of the length measurement SEM. In the case of a photoresist dimension of a via, the dimension value is shifted to a larger side.

Since the newest via dimension is designed to be about several ten nm to a hundred and several ten nm, a large dimension measurement error occurs by the dimension fluctuation when an electron beam irradiation of several seconds to ten and several seconds is carried out in positioning and focusing.

SUMMARY OF THE INVENTION

According to the present invention, there is provided a length measurement pattern disposed in a resist pattern and used for dimension measurement of said resist pattern by length measurement SEM, wherein said length measurement pattern includes: a first pattern serving as an object of length measurement by the length measurement SEM; and a second pattern disposed to be spaced apart from said first pattern and used for positioning and focusing of the length measurement SEM.

Also, there is provided a semiconductor device including a length measurement pattern disposed in a resist pattern and used for dimension measurement of said resist pattern by length measurement SEM, wherein said length measurement pattern includes: a first pattern serving as an object of length measurement by length measurement SEM; and a second pattern disposed to be spaced apart from said first pattern and used for positioning and focusing of the length measurement SEM.

Also, there is provided a method of manufacturing a semiconductor device by forming a contact and a via on a diffusion layer and on a lower layer interconnect, respectively, with a photoresist, wherein said method includes: focusing length measurement SEM on a second pattern disposed to be spaced apart from a first pattern serving as an object of length measurement by the length measurement SEM and used for positioning and focusing of the length measurement SEM; and moving a field of view of the length measurement SEM to a region where said first pattern is disposed, so as to perform the length measurement of said first pattern.

According to the present invention, the dimension measurement error can be restrained to the minimum by moving the field of view to a region including the dimension measurement pattern (first pattern) after positioning and focusing with the positioning and focusing pattern (second pattern).

Since the positioning and the focusing at the time of length measurement SEM is carried out with an exclusive-use positioning and focusing pattern, electron beams are not applied to the dimension measurement pattern at the time of positioning and focusing, so that the dimension fluctuation of the photoresist pattern caused by the electron beams is restrained to the minimum, making it possible to grasp the dimension of the photoresist and to perform centering with a high precision.

BRIEF DESCRIPTION OF THE DRAWINGS

The above and other objects, advantages and features of the present invention will be more apparent from the following description taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 4:
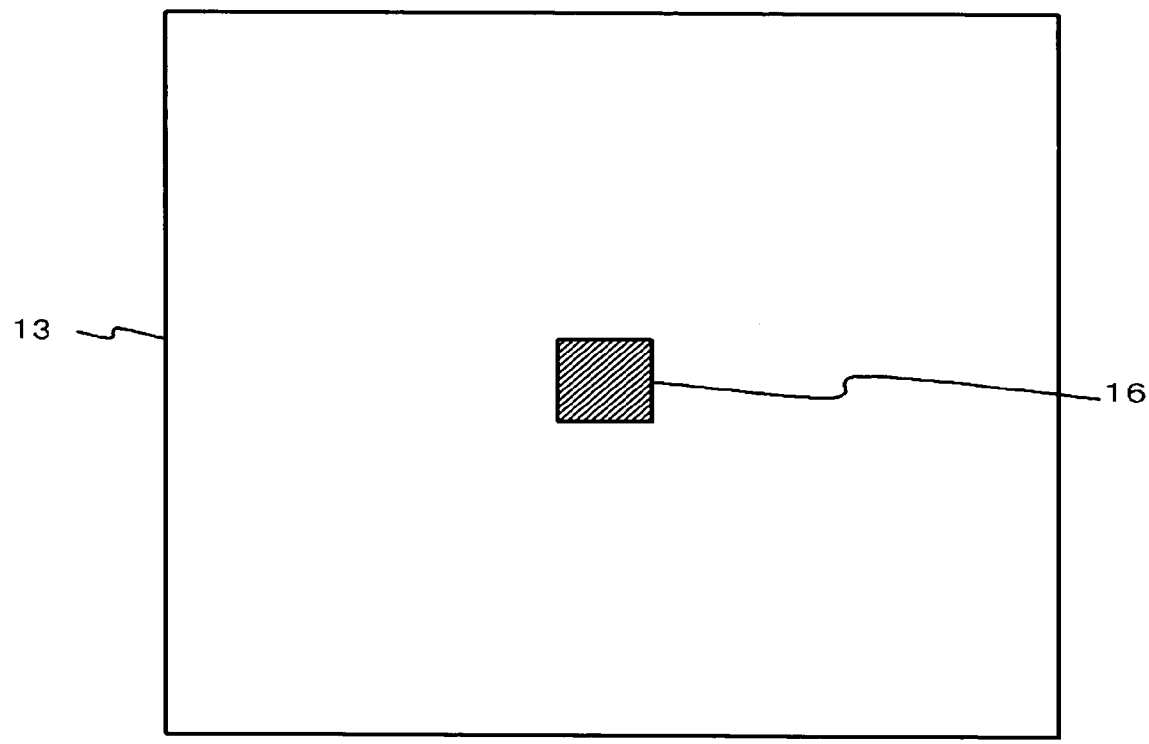
FIG. 4 is a plan view illustrating a conventional isolated pattern.

Hereafter, embodiments of the invention will be described with reference to the attached drawings. Here, parts having the same construction or having the same function as those shown in FIG. 4 are denoted with the same symbols.

Figure 1:
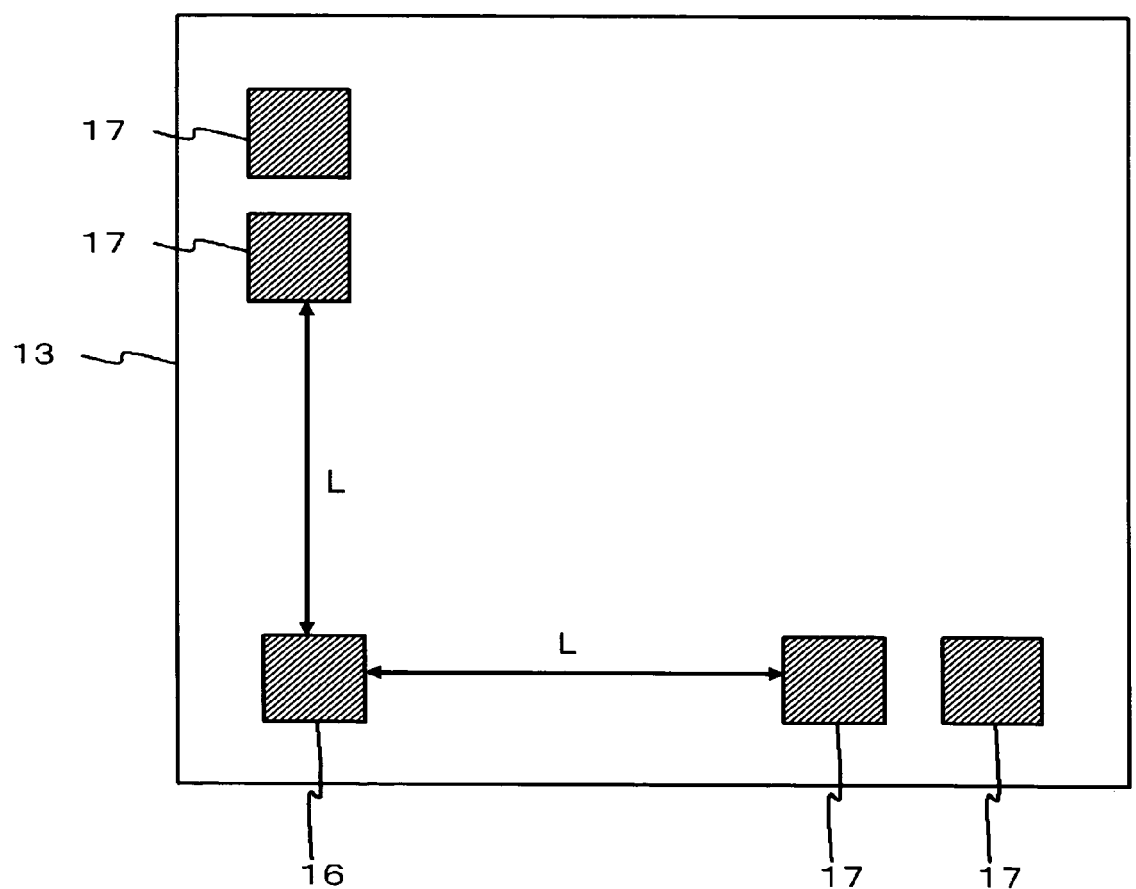
FIG. 1 is a plan view illustrating a dimension measurement pattern of an isolated pattern of a semiconductor device according to the embodiment.

FIG. 1 shows an example of a dimension measurement pattern of an isolated pattern according to the first embodiment of the invention.

The dimension measurement pattern shown in FIG. 1 is disposed in a resist pattern and is used for the dimension measurement of the resist pattern by the length measurement SEM. Specifically, the length measurement pattern is used in forming a contact and a via on a diffusion layer and on a lower layer interconnect, respectively, with a photoresist.

This dimension measurement pattern is constructed in the following manner. Namely, a dimension measurement pattern (first pattern) 16 which is an isolated pattern of the via is formed on the lower layer interconnect 13 of the via, and a positioning and focusing pattern (second pattern) 17 for positioning and focusing at the time of length measurement SEM is disposed in the neighborhood of this dimension measurement pattern 16. At this time, the length L between the dimension measurement pattern 16 and the positioning and focusing pattern 17 has an optimal value, as will be described later.

Figure 3:
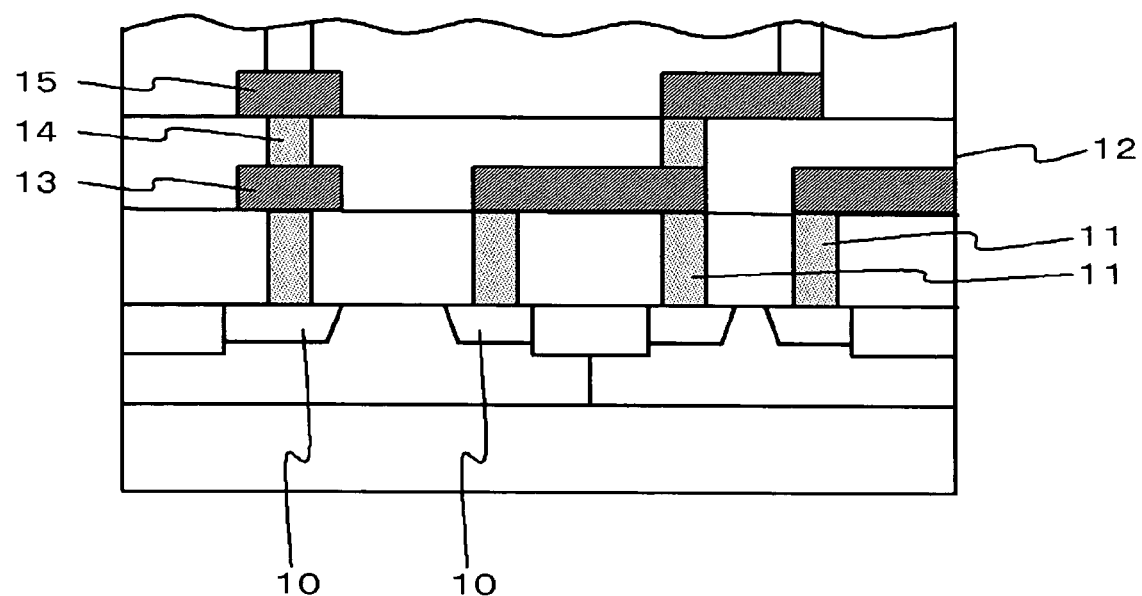
FIG. 3 is a cross-sectional view illustrating a conventional semiconductor device having a multiple layer interconnect structure.

Here, in FIG. 1, the shape of the interconnect of the lower layer interconnect 13 is represented by a square having a large area, and the dimension measurement pattern 16 and the positioning and focusing pattern 17 are represented by squares having a small area; however, these shapes are arbitrary and are not limited to the illustrated shapes. Also, though the interconnect (interconnect 15 in FIG. 3) of the upper layer of the via is not illustrated, this can be freely set by a designer.

After the positioning and the focusing are carried out with the use of the positioning and focusing pattern 17 at the time of length measurement SEM, which is disposed in the neighborhood of the dimension measurement pattern 16, the field of view is moved to the dimension measurement pattern 16 for carrying out the dimension measurement. This allows that the period of time for irradiation with the electron beams can be restrained to the shortest period of time in which a correct dimension measurement can be made, so that a photoresist dimension with less dimension errors can be obtained.

Namely, this method of manufacturing a semiconductor device includes a first step of focusing the length measurement SEM on the positioning and focusing pattern 17 disposed to be spaced apart from the dimension measurement pattern 16 serving as an object of length measurement by the length measurement SEM and used for positioning and focusing of the length measurement SEM, and a second step of moving the field of view of the length measurement SEM to a region where the dimension measurement pattern 16 is disposed, so as to perform the length measurement of the dimension measurement pattern 16.

At this time, when the length L between the dimension measurement pattern 16 and the positioning and focusing pattern 17 is too short, the dimension measurement pattern 16 is also irradiated with the electron beams at the time of positioning and focusing. On the other hand, when this length L is too large, a position shift or a focus shift is generated at the time of movement of the field of view after the positioning and the focusing are carried out. Therefore, it has been found out that the length L between the dimension measurement pattern 16 and the positioning and focusing pattern 17 is optimally five to twenty times as large as a designed value of the via serving as an object of measurement.

As described above, since the positioning and the focusing at the time of length measurement SEM is carried out with the exclusive-use positioning and focusing pattern 17, the dimension measurement pattern 16 is not irradiated with electron beams at the time of positioning and focusing, so that the dimension fluctuation of the photoresist pattern caused by the electron beams is restrained to the minimum.

The above-described embodiment is an example in which the dimension measurement pattern is an isolated pattern. However, the present invention can be applied also to the case of a dense pattern, as described below.

Figure 2:
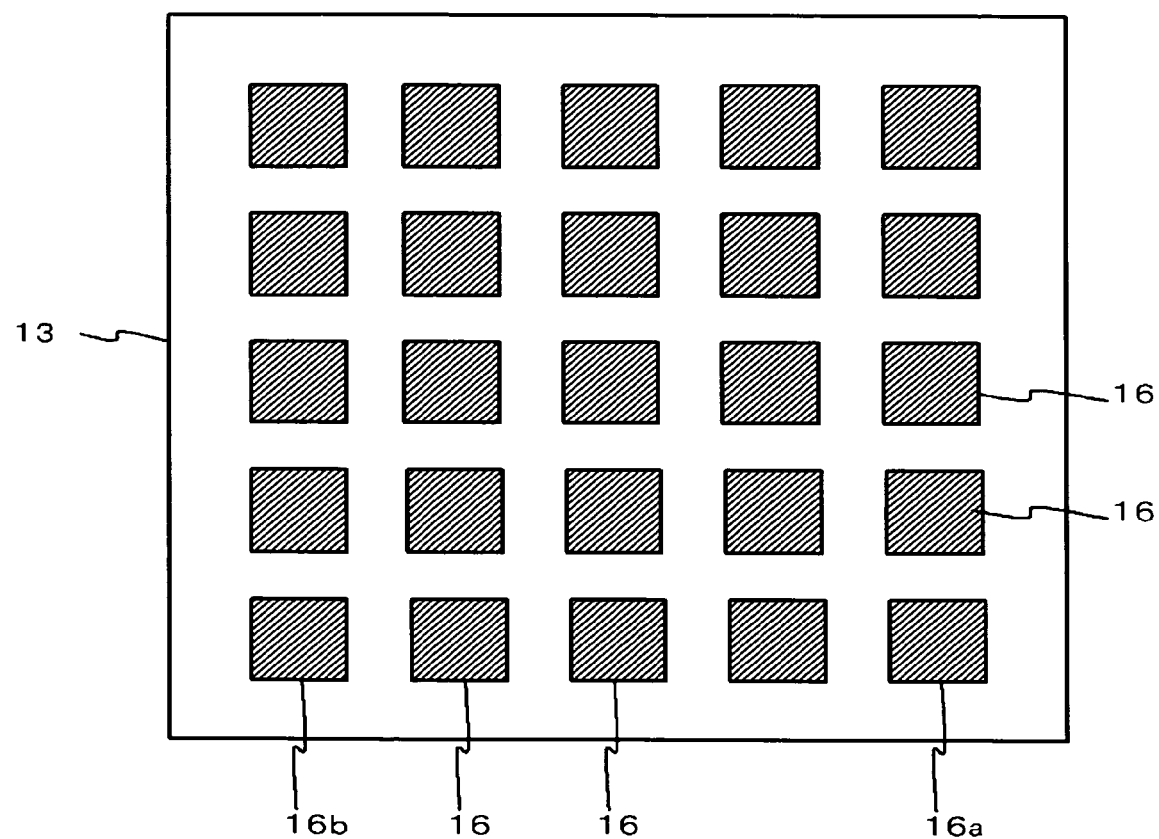
FIG. 2 is a plan view illustrating a dimension measurement pattern of a dense pattern.

FIG. 2 shows an example of a dimension measurement pattern of a dense pattern according to the second embodiment of the invention. In this example, a dimension measurement pattern 16 of a dense pattern having a sum of 25 patterns (this number is arbitrary) with five patterns in the longitudinal direction and five patterns in the lateral direction is formed in the lower layer interconnect 13.

Now, assuming that the total size of the dense pattern is twenty or more times as large as the designed value of the via, similar effects can be obtained by performing the positioning and the focusing with a dimension measurement pattern 16a at the right end of the dense pattern shown in FIG. 2 and performing the dimension measurement, for example, with a dimension measurement pattern 16b at the left end after moving the field of view within the same dense pattern. In this example, a part of the dimension measurement pattern 16 of the dense pattern disposed in a lattice form is used as the first pattern, and the rest of the dimension measurement pattern 16 is used as a positioning pattern used for positioning and focusing of the length measurement SEM. In this case, the total size of the dimension measurement pattern 16 of the dense pattern may be defined to be five to twenty times as large as the designed value of the via.

Also, when the total size of the dimension measurement pattern 16 of the dense pattern is less than five times as large as the designed value of the via, a positioning and focusing pattern 17 (not illustrated) may be separately disposed at the position of a length five to twenty times as large as the designed value of the via, in the same manner as in the first embodiment.

It is apparent that the present invention is not limited to the above embodiment, that may be modified and changed without departing from the scope and spirit of the invention.

What is claimed is:

1. A length measurement pattern disposed in a resist pattern and used for dimension measurement of said resist pattern by length measurement SEM, wherein said length measurement pattern includes:
    a first pattern serving as an object of length measurement by the length measurement SEM; and
    a second pattern disposed to be spaced apart from said first pattern and used for positioning and focusing of the length measurement SEM.

2. The length measurement pattern according to claim 1, wherein said first pattern is an isolated pattern made of one pattern.

3. The length measurement pattern according to claim 1, wherein said first pattern is a dense pattern made of a plurality of patterns.

4. The length measurement pattern according to claim 3, wherein a length between said first pattern and said second pattern is five to twenty times as large as a designed value of a via serving as an object of measurement.

5. The length measurement pattern according to claim 1, wherein said first pattern is a dense pattern made of a plurality of patterns, and said second pattern is disposed in said dense pattern.

6. The length measurement pattern according to claim 2, wherein a length between said first pattern and said second pattern is five to twenty times as large as a designed value of a via serving as an object of measurement.

7. The length measurement pattern according to claim 5, wherein a length between said first pattern and said second pattern is five to twenty times as large as a designed value of a via serving as an object of measurement.

8. A semiconductor device comprising a length measurement pattern for forming a contact and a via on a diffusion layer and on a lower layer interconnect, respectively, with a photoresist,
    wherein said length measurement pattern includes:
    a first pattern serving as an object of length measurement by length measurement SEM; and
    a second pattern disposed to be spaced apart from said first pattern and used for positioning and focusing of the length measurement SEM.

9. The semiconductor device according to claim 8, wherein said first pattern is an isolated pattern made of one pattern.

10. The semiconductor device according to claim 9, wherein a length between said first pattern and said second pattern is five to twenty times as large as a designed value of the via serving as an object of measurement.

11. The semiconductor device according to claim 8, wherein said first pattern is a dense pattern made of a plurality of patterns.

12. The semiconductor device according to claim 11, wherein a length between said first pattern and said second pattern is five to twenty times as large as a designed value of the via serving as an object of measurement.

13. The semiconductor device according to claim 8, wherein said first pattern is a dense pattern made of a plurality of patterns, and said second pattern is disposed in said dense pattern.

14. The semiconductor device according to claim 13, wherein a length between said first pattern and said second pattern is five to twenty times as large as a designed value of the via serving as an object of measurement.

15. A method of manufacturing a semiconductor device by forming a contact and a via on a diffusion layer and on a lower layer interconnect, respectively, with a photoresist, wherein said method includes:
    focusing length measurement SEM on a second pattern disposed to be spaced apart from a first pattern serving as an object of length measurement by the length measurement SEM and used for positioning and focusing of the length measurement SEM; and
    moving a field of view of the length measurement SEM to a region where said first pattern is disposed, so as to perform the length measurement of said first pattern.

16. The method of manufacturing a semiconductor device according to claim 15, wherein said first pattern is an isolated pattern made of one pattern.

17. The method of manufacturing a semiconductor device according to claim 15, wherein said first pattern is a dense pattern made of a plurality of patterns.

18. The method of manufacturing a semiconductor device according to claim 15, wherein said first pattern is a dense pattern made of a plurality of patterns, and said second pattern is disposed in said dense pattern.

19. The method of manufacturing a semiconductor device according to claim 15, wherein a length between said first pattern and said second pattern is five to twenty times as large as a designed value of the via serving as an object of measurement.

* * * * *